(12) United States Patent
Pan et al.

(10) Patent No.: US 11,936,561 B2
(45) Date of Patent: Mar. 19, 2024

(54) RATE-OPTIMIZED CONGESTION MANAGEMENT

(71) Applicant: Pensando Systems Inc., Milpitas, CA (US)

(72) Inventors: Rong Pan, Saratoga, CA (US); Peter Newman, Fremont, CA (US)

(73) Assignee: Pensando Systems, Inc., Milpitas, CA (US)

( * ) Notice: Subject to any disclaimer, the term of this patent is extended or adjusted under 35 U.S.C. 154(b) by 176 days.

(21) Appl. No.: 17/523,732

(22) Filed: Nov. 10, 2021

(65) Prior Publication Data

US 2022/0070097 A1    Mar. 3, 2022

Related U.S. Application Data

(62) Division of application No. 16/415,609, filed on May 17, 2019, now Pat. No. 11,212,227.

(51) Int. Cl.
*H04L 47/263*    (2022.01)
*H04L 43/0852*    (2022.01)
(Continued)

(52) U.S. Cl.
CPC .......... *H04L 47/11* (2013.01); *H04L 43/0858* (2013.01); *H04L 43/16* (2013.01);
(Continued)

(58) Field of Classification Search
CPC . H04L 27/127; H04L 47/263; H04L 27/2646; H04L 25/0262; H04L 25/0301;
(Continued)

(56) References Cited

U.S. PATENT DOCUMENTS 5,264,843 A   *   11/1993   Silvian ................... G08C 17/04
                                                              340/870.18
7,688,968 B1      3/2010   Chen et al.
(Continued)

FOREIGN PATENT DOCUMENTS

EP           2522109 A1    11/2012
WO     WO-0233896 A2    4/2002
(Continued)

OTHER PUBLICATIONS

Liu et al. Offloading distributed applications onto smartnics using ipipe. Proceedings of the ACM Special Interest Group on Data Communication pp. 318-333 (2019).
(Continued)

*Primary Examiner* — Salvador E Rivas
(74) *Attorney, Agent, or Firm* — Patterson + Sheridan, LLP

(57) ABSTRACT

This disclosure provides methods and systems for reducing congestion in RoCEv2 networks. The method is configured to operate large-scale in data centers on traffic flowing from a sender node to a receiver node. The method described has three stages: a fast start stage, a transition stage, and a regulation stage. In the fast start stage, the sender sends data to the receiver at a fast initial rate. This may continue until the receiver observes a congestion event. When this happens, the sender reduces the data transfer rate as the method enters the transition stage. From a reduced rate, the method enters the regulation stage, where the rate is increased using a combination of a feedback control loop and an additive increase multiplicative decrease (AIMD) algorithm.

25 Claims, 9 Drawing Sheets

(51) Int. Cl.
| | |
|---|---|
| *H04L 43/16* | (2022.01) |
| *H04L 47/11* | (2022.01) |
| *H04L 47/25* | (2022.01) |
| *H04L 47/283* | (2022.01) |
| *H04W 28/22* | (2009.01) |
| *H04W 52/26* | (2009.01) |
| *H04B 5/00* | (2006.01) |
| *H04B 7/26* | (2006.01) |
| *H04L 1/00* | (2006.01) |
| *H04L 27/26* | (2006.01) |
| *H04W 88/02* | (2009.01) |

(52) U.S. Cl.
CPC ............ *H04L 47/25* (2013.01); *H04L 47/263* (2013.01); *H04L 47/283* (2013.01); *H04W 28/22* (2013.01); *H04W 52/26* (2013.01); *H04B 5/0031* (2013.01); *H04B 7/264* (2013.01); *H04B 7/2659* (2013.01); *H04L 1/0001* (2013.01); *H04L 27/2646* (2013.01); *H04W 88/021* (2013.01)

(58) Field of Classification Search
CPC ...... H04L 47/26; H04L 1/0001; H04W 84/14; H04W 88/021; H04B 7/264; H04B 5/0031
See application file for complete search history.

(56) References Cited

U.S. PATENT DOCUMENTS

| | | | |
|---|---|---|---|
| 8,370,622 B1 | 2/2013 | Dattatreya et al. | |
| 8,813,225 B1 | 8/2014 | Fuller et al. | |
| 10,104,039 B1 | 10/2018 | Knecht et al. | |
| 11,153,221 B2 | 10/2021 | Cheethirala et al. | |
| 2003/0174649 A1 | 9/2003 | Shankar et al. | |
| 2004/0071085 A1 | 4/2004 | Shaham et al. | |
| 2006/0050640 A1 | 3/2006 | Jin et al. | |
| 2006/0153179 A1 | 7/2006 | Ho et al. | |
| 2008/0037420 A1* | 2/2008 | Tang | H04L 69/163 370/231 |
| 2008/0084900 A1 | 4/2008 | Dunn | |
| 2008/0181112 A1 | 7/2008 | Beck et al. | |
| 2008/0304412 A1 | 12/2008 | Schine et al. | |
| 2010/0011118 A1 | 1/2010 | Chang et al. | |
| 2010/0031042 A1 | 2/2010 | Di Crescenzo et al. | |
| 2013/0195123 A1 | 8/2013 | Stern et al. | |
| 2013/0204965 A1 | 8/2013 | Masputra et al. | |
| 2013/0279338 A1 | 10/2013 | Mehrotra et al. | |
| 2013/0322247 A1 | 12/2013 | Li et al. | |
| 2014/0003242 A1 | 1/2014 | Nadas et al. | |
| 2014/0164641 A1 | 6/2014 | Ye et al. | |
| 2014/0177455 A1 | 6/2014 | Astigarraga et al. | |
| 2014/0281668 A1* | 9/2014 | He | G06F 1/3253 714/4.5 |
| 2014/0348182 A1 | 11/2014 | Chandra et al. | |
| 2015/0341273 A1 | 11/2015 | Naouri et al. | |
| 2016/0036909 A1 | 2/2016 | Joshi | |
| 2016/0212098 A1 | 7/2016 | Roch | |
| 2016/0374094 A1* | 12/2016 | Bakshe | H04W 28/22 |
| 2017/0019803 A1* | 1/2017 | Nguyen | H04L 47/193 |
| 2017/0078205 A1 | 3/2017 | Stalling et al. | |
| 2017/0163633 A1 | 6/2017 | Yang et al. | |
| 2018/0083607 A1* | 3/2018 | Kanomata | H03K 5/22 |
| 2018/0212885 A1 | 7/2018 | Contavalli et al. | |
| 2018/0302328 A1 | 10/2018 | Keith et al. | |
| 2019/0012156 A1 | 1/2019 | Daly et al. | |
| 2019/0216392 A1* | 7/2019 | Bower | A61B 5/369 |
| 2019/0312927 A1* | 10/2019 | Shalunov | H04L 9/0643 |
| 2019/0327323 A1 | 10/2019 | Daly et al. | |
| 2019/0386913 A1 | 12/2019 | Wei | |
| 2020/0076736 A1 | 3/2020 | Tilli | |
| 2020/0336426 A1 | 10/2020 | Tadimeti et al. | |
| 2020/0366608 A1 | 11/2020 | Pan et al. | |
| 2020/0382426 A1 | 12/2020 | Li et al. | |
| 2021/0194829 A1 | 6/2021 | Sun et al. | |
| 2021/0243169 A1 | 8/2021 | Kittur et al. | |
| 2021/0314303 A1 | 10/2021 | Kittur et al. | |
| 2021/0336883 A1 | 10/2021 | Pudiyapura et al. | |

FOREIGN PATENT DOCUMENTS

| | | |
|---|---|---|
| WO | WO-2019046603 A1 | 3/2019 |
| WO | WO-2019133434 A1 | 7/2019 |
| WO | WO-2019164827 A1 | 8/2019 |
| WO | WO-2019209181 A1 | 10/2019 |
| WO | WO-2020236599 A1 | 11/2020 |
| WO | WO-2021041622 A1 | 3/2021 |
| WO | WO-2021155282 A1 | 8/2021 |
| WO | WO-2021207231 A1 | 10/2021 |

OTHER PUBLICATIONS

PCT/US2018/048893 International Search Report and Written Opinion dated Jan. 3, 2019.
PCT/US2020/033154 International Search Report and Written Opinion dated Aug. 26, 2020.
PCT/US2020/048127 International Search Report and Written Opinion dated Jan. 21, 2021.
PCT/US2021/015896 International Search Report and Written Opinion dated Apr. 14, 2021.
PCT/US2021/026001 International Search Report and Written Opinion dated Jun. 30, 2021.
U.S. Appl. No. 16/415,609 Office Action dated May 5, 2021.
U.S. Appl. No. 16/553,947 Office Action dated Dec. 1, 2020.
U.S. Appl. No. 16/553,947 Office Action dated Jan. 27, 2021.
U.S. Appl. No. 16/643,311 Office Action dated Sep. 24, 2021.
U.S. Appl. No. 16/842,537 Office Action dated Oct. 15, 2021.
EP18852029.0 Extended European Search Report dated Apr. 22, 2021.
PCT/US2018/048893 International Preliminary Report on Patentability dated Mar. 3, 2020.
PCT/US2020/033154 International Preliminary Report on Patentability dated Nov. 16, 2021.
PCT/US2020/048127 Invitation to Pay Additional Fees dated Nov. 4, 2020.
PCT/US2020/048127 Invitation to Pay Additional Fees dated Oct. 4, 2020.
Mittal, Radhika, "TIMELY: RTT-based Congestion Control for the Datacenter", ACM, New York, NY, vol. 45, No. 4, Aug. 17, 2015, pp. 537-550.
Zhu, Yibo, "Congestion Control for Large-Scale RDMA Deployments", Hot Topics in Middleboxes and Network Function Virtualization, ACM, New York, NY, Aug. 17, 2015, pp. 523-536.
Lee, Changhyun, "DX: Latency-Based Congestion Control for Datacenters", IEEE, ACM Transactions on Networking, IEEE/ACM, New York, NY, vol. 25, No. 1, Feb. 1, 2017, pp. 335-348.
Extended European Search Report from EP 20809493.8 dated Aug. 16, 2022.
Office Action from Indian Patent Application No. 202117058444 dated Oct. 18, 2023.
Zhu, Yibo, et al., "Congestion Control for Large Scale RDMA Deployments", Hot Topics in Middleboxes and Network Function Virtualization, ACM, 2 Penn Plaza, Suite 701, New York, NY 101-21, USA.
Lee, Changhyun, et al., "DX: Latency-Based Congestion Control for Datacenters", IEE/ACm Transactions on Networking, vol. 25, No. 1 Feb. 2017.
Mittal, Radhika, et al., "TIMELY: RTT-based COngestion Control for the Datacenter", Communication Review, ACM, New York, NY, vol. 45, No. 4, Aug. 2015.

* cited by examiner

RATE-OPTIMIZED CONGESTION MANAGEMENT

CROSS-REFERENCE

This application is a divisional of U.S. application Ser. No. 16/415,609, filed on May 17, 2019, entitled "Rate-Optimized Congestion Management," the contents of which is incorporated herein by reference for all purposes.

BACKGROUND

Data center applications demand high throughput and ultra-low latency from the network including hosts' network stacks. Due to high CPU overhead of standard TCP/IP, Remote Direct Memory Access (RDMA) over Ethernet (RoCEv2), as an alternative technology, is deployed in modern data centers to achieve low latency and high performance. When heavily loaded, data center networks may experience congestion and incur packet drops. As a result, RDMA's performance degrades drastically and RoCEv2 relies on Priority-based Flow Control (PFC) to achieve a drop free network. PFC may cause congestion spreading, where a traffic slowdown in one area of a network slows traffic in other areas of the network. Hence, congestion management is necessary to avoid congestion spreading. Existing methods of congestion management in RoCEv2 networks, such as Data Center Quantized Congestion Notification (DCQCN), may operate poorly at large scale, generating thousands of pause frames, achieving poor network utilization and average throughput, and causing congested flows to finish prohibitively slowly.

SUMMARY

There is a need for managing congestion in data center networks that is effective at large scale. Such a method would achieve high link utilization, ultra-low latency and network fairness. The disclosed method achieves these goals by dynamically changing data rates in response to congestion events and by combining a feedback control loop with an additive increase multiplicative decrease (AIMD) algorithm.

In one aspect, a computer-implemented method of managing congestion in a network protocol us disclosed. The method comprises detecting a congestion event in the network. The method next comprises slowing a data transfer rate from an initial rate to a minimum rate. The method next comprises increasing the data transfer rate to half of the initial rate. The method next comprises periodically monitoring a one-way latency of the network. Finally, the network comprises adjusting the data transfer rate using a feedback control loop and an additive increase multiplicative decrease (AIMD) algorithm. In some embodiments, setting an initial data transfer rate further comprises setting an initial window that is equal to a bandwidth delay product and ramping up window size if no congestion is detected after setting the initial window. In some embodiments, the initial data transfer rate is equal to a line rate of the network. In some embodiments, the threshold latency is based on a round trip time for a transmission of a data packet. In some embodiments, the minimum data transfer rate is at least less than one percent of the initial data transfer rate. In some embodiments, the feedback control loop comprises a proportional-integral controller. In some embodiments, transferring data from the sender to the receiver at a minimum data transfer rate comprises sending a congestion notification packet from the receiver to the sender, and updating a rate upon sender receipt of the congestion notification packet. In some embodiments, continuously monitoring a one-way latency comprises keeping track of a total number of bytes of received packets. In some embodiments, the managed transfer rate is calculated after one period at the minimum transfer rate and one period at half of the initial rate. In some embodiments, a period is based on a round trip time of a transmitted packet. In some embodiments, the initial transfer rate is based on line rates between a sender and a receiver. In some embodiments, the initial transfer rate is a minimum rate between a link rate of the sender and a link rate of the receiver. In some embodiments, the AIMD algorithm includes performing an addition to the managed rate if the managed rate is below a threshold and a multiplication to the managed rate if the managed rate is above the threshold. In some embodiments, the addition is by a positive number. In some embodiments, the multiplication is by a number between 0 and 1. In some embodiments, the computer-implemented method further comprises obtaining at least the initial rate from adjusting the data transfer rate for a threshold number of periods and monitoring the network for congestion events.

In another aspect, a system for managing network congestion in a network is disclosed. The system comprises a plurality of computing nodes. A computing node comprises a memory for storing one or more previously obtained latency values and a set of instructions in addition to one or more processors. The processors are configured to execute the set of instructions to detect a congestion event in the physical layer link, slow a data transfer rate from an initial rate to a minimum rate, increase the data transfer rate to half of the initial rate, periodically monitor a one-way latency of the network, and adjust the data transfer rate using a feedback control loop and an additive increase multiplicative decrease (AIMD) algorithm. In some embodiments, the network has at least one Ethernet link. In some embodiments, the plurality of computing nodes includes a sender node and a receiver node. In some embodiments, setting an initial data transfer rate further comprises setting an initial window that is equal to a bandwidth delay product and ramping up window size if no congestion is detected after setting the initial window. In some embodiments, the initial data transfer rate is equal to a line rate of the Ethernet link. In some embodiments, the threshold latency is based on a round trip time for a transmission of a data packet. In some embodiments, the minimum data transfer rate is at least less than one percent of the initial data transfer rate. In some embodiments, the feedback control loop comprises a proportional-integral controller. In some embodiments, transferring data from the sender to the receiver at a minimum data transfer rate comprises: sending a congestion notification packet from the receiver to the sender, and updating a rate upon sender receipt of the congestion notification packet. In some embodiments, continuously monitoring a one-way latency comprises keeping track of a total number of bytes of received packets. In some embodiments, the managed transfer rate is calculated after one period at the minimum transfer rate and one period at half of the initial rate. In some embodiments, a period is based on a round trip time of a transmitted packet. In some embodiments, the initial transfer rate is based on line rates between a sender and a receiver. In some embodiments, the initial transfer rate is a minimum line rate between the sender and receiver. In some embodiments, the AIMD algorithm includes performing an addition to the managed rate if the managed rate is below a threshold and a multiplication to the managed rate if the managed rate is above the threshold. In some embodiments, the addition is by a positive number. In some embodiments, the multiplication is by a number between 0 and 1.

In yet another aspect, a computer-implemented method of managing congestion in a network protocol us disclosed. The method includes a fast start stage, comprising setting a data rate to an initial data rate and performing data transfer between a sender and a receiver until the receiver detects a congestion event. The method also includes a transition stage, comprising reducing the data rate to a minimum data rate for a period and then increasing the data rate to half of the initial rate for a period. The method also includes a regulation stage, comprising using a combination of a feedback control loop and an additive increase multiplicative decrease (AIMD) algorithm to modify the data rate. In some embodiments, the computer-implemented method further comprises, prior to the fast start stage, an initial setup phase, comprising sharing clock rates and line rates between the sender and the receiver. In some embodiments, the computer-implemented method further comprises, prior to the fast start stage, setting a window size to an initial window size for sending data packets. In some embodiments, the computer-implemented method further comprises increasing the window size while no congestion events are detected within the network. In some embodiments, the window size is increased exponentially. In some embodiments, the transition stage begins following the detection of the congestion event. In some embodiments, the feedback control loop is a proportional integral algorithm. In some embodiments, the feedback control loop may be described as the difference between a current rate, a proportional term, and an integral term. In some embodiments, the proportional term describes a difference between a current latency and a threshold latency, while the integral term describes a difference between a current latency and a previous latency. In some embodiments, the multiplicative decrease is performed in response to a probabilistic event. In some embodiments, the multiplicative decrease is performed at a lower frequency than the feedback control loop.

In yet another aspect, a system for managing network congestion in a network is disclosed. The system includes a plurality of computing nodes. A computing node includes a memory for storing one or more previously obtained latency values and a set of instructions. The computing node also includes one or more processors configured to execute the set of instructions to implement a fast start stage, comprising setting a data rate to an initial data rate and performing data transfer between a sender and a receiver until the receiver detects a congestion event, a transition stage, comprising reducing the data rate to a minimum data rate for a period and then increasing the data rate to half of the initial rate for a period, and a regulation stage, comprising using a combination of a feedback control loop and an additive increase multiplicative decrease (AIMD) algorithm to modify the data rate. In some embodiments, the system further comprises, prior to the fast start stage, an initial setup phase, comprising sharing clock rates and line rates between the sender and the receiver. In some embodiments, the system further comprises, prior to the fast start stage, setting a window size to an initial window size for sending data packets. In some embodiments, the system further comprises increasing the window size while no congestion events are detected within the network. In some embodiments, the window size is increased exponentially. In some embodiments, the transition stage begins following the detection of the congestion event. In some embodiments, the feedback control loop is a proportional integral algorithm. In some embodiments, the feedback control loop may be described as the difference between a current rate, a proportional term, and an integral term. In some embodiments, the proportional term describes a difference between a current latency and a threshold latency, while the integral term describes a difference between a current latency and a previous latency. In some embodiments, the multiplicative decrease is performed in response to a probabilistic event. In some embodiments, the multiplicative decrease is performed at a lower frequency than the feedback control loop.

BRIEF DESCRIPTION OF THE FIGURES

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION OF THE FIGURES

The disclosed method effectively manages congestion in RoCEv2 networks at the link layer, for example, in Ethernet networks. The method may be implemented on communications between sender and receiver nodes, which may be connected by one or more network links. The sender and receiver may manage data flows from multiple users and may have to maintain efficiency and fairness for transmitted data between the multiple users sending data through the link.

The method disclosed has three main stages: a fast start stage, a transition stage, and a regulation stage. In the fast start stage, the sender and receiver may send data to one another at an initial rate until the receiver records a congestion event. The congestion event may be detected as a spike in latency measured from the receiver's perspective. Following the congestion event, the transition stage begins. In the transition stage, the sender initially reduces the data rate to a minimum rate for a period, and then increases the data rate to half the initial rate, in order to manage the congestion. Following the transition stage, the regulation stage uses a combination of a feedback control and an additive increase multiplicative decrease (AIMD) algorithm to increase the rate while maintaining low latency, efficiency and fairness.

The feedback control loop guides the main rate calculation in the regulation stage, in which the rate increase or decrease is precisely tuned using, for example, a proportional-integral algorithm. The AIMD algorithm adds a small perturbation that causes the flows to rebalance themselves over a long time period. This is done without causing too much disruption to the total arrival rate to a congested queue of data packets.

Following the regulation stage, the sender and receiver may eventually recommence sending data at the initial rate. The method may restart when another congestion event is detected.

In one aspect, methods and systems of the present disclosure are provided for determining a network congestion state based on measurement of a variation of latency. The latency measurement may be a forward path latency or a round trip latency, such as a round-trip time (RTT) delay. The variation or change of latency may be used as the congestion signal thus the sender may be timely informed about the extent of congestion.

Figure 1:
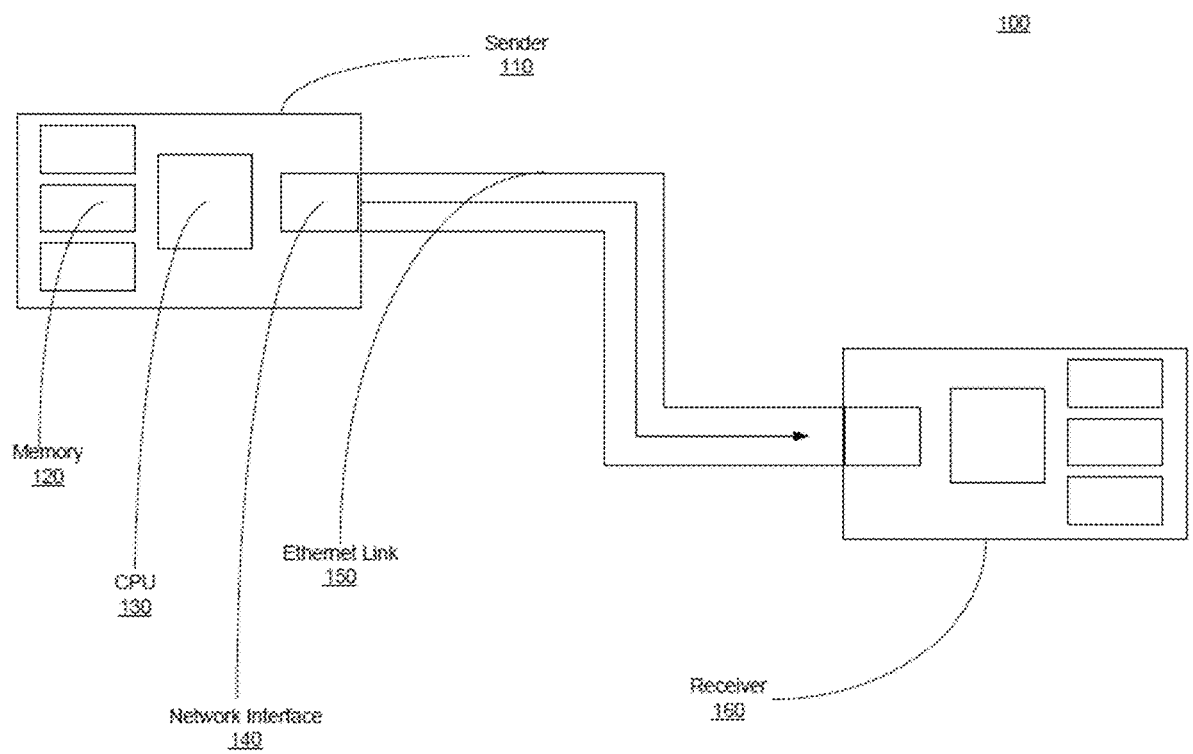
FIG. 1 is an exemplary block diagram illustrating communication over a link.

FIG. 1 is an exemplary block diagram illustrating communication over a link 103, in accordance with embodiments of the invention. A sender 101 and a receiver 105 are in communication over the link 103. In examples described herein, the system delegates particular sending and receiving tasks to the sender and the receiver. However, packets can be sent from the sender to the receiver or receiver to sender. The communication may employ a congestion management mechanism to control congestion. In some cases, a state of network congestion along the link may be determined. The sender and receiver may also be referred to as source and destination respectively. In other cases, network congestion for a round trip (from sender to receiver and back) may be determined.

The sender 101 and the receiver 105 can be various types of computing devices such as personal computers, tablet computers, smart phones, set top boxes, desktop computers, laptops, gaming systems, servers, data centers, and various other devices or systems. A plurality of other devices or components can establish a connection through the network. One or more senders can connect with one or more receivers. The sender and the receiver can connect to the network with wired and/or wireless connection. The sender or receiver may be referred to as a source node and destination node in the network. A node may be any device equipped with communication capabilities. The communications may be wired or wireless communications.

The sender and receiver each have memory 120 and a CPU 130. The receiver may use RDMA to access items stored in the sender's memory while bypassing the sender's operating system.

The link 103 can be from a wireless network, wired network or a combination of both. For example, the network may comprise one or more of the Internet, an intranet, a cellular network, a home network, a person area network, etc., through an ISP, cellular, or broadband cable provider, and the like. The link 103 can be related to an internet protocol interfaces, such as one or more network components, data servers, connection nodes, switches, and the like. In another aspect, the sender 101 and the receiver 105 can be considered as part of the link 103.

Both the sender 101 and receiver 105 include network interfaces 140, which may be network interface cards (NICs). The network interfaces allow the sender and receiver nodes to interface with the link 103. The network interfaces 140 may have smart capabilities, allowing them to implement algorithms to control data transmission rates to nodes in the network.

A data packet 111 sent from the source node (e.g., sender) to the destination node (e.g., receiver) may or may not experience delay either along the link. In some embodiments, measurement of variation or change of latency may provide immediate signals of an extent of congestion. The latency may be calculated by an arrival time of the data packet 111 minus send time of the data packet 111. In some embodiments, the send time of the data packet is provided by a clock 107 of the sender and the arrival/receipt time of the data packet is provided by a clock 109 of the receiver.

The sender clock 107 and the receiver clock 109 need not be synchronized. In some cases, the sender clock 107 and/or receiver clock 109 may be free running clocks that are not synchronized. In some cases, the sender clock 107 and receiver clock 109 are operating at the same rate or frequency. Alternatively, the sender clock 107 and receiver clock 109 may run at different rates or frequencies. In some cases, a common rate or frequency may be set up at the connection establishment time. For instance, the common rate or frequency is a pre-determined frequency set up by a connection protocol prior to the transmission of a data packet. In some cases, the rate or frequency associated with the sender and receiver respectively may be exchanged at the connection establishment. In some cases, the receiver may be notified by the rate or frequency of the sender. In alternative cases, the sender and the receiver may run at different frequencies that are unacknowledged to one another. For example, the sender and the receiver both send a handshake request (e.g., a control packet with a handshake type) at connection setup where the handshake packet may comprise a common frequency that the sender and receiver both agree to communicate using or frequencies associated with the sender and receiver respectively. It should be noted that the clock frequency or rate can be transmitted at any time in addition to the connection establishment time. For instance, the handshake packet comprising the frequency of the clock can be sent once at an interval when a notification message is generated or when a timeout timer expires. The clock may comprise any type of local hardware or device clock such as NIC hardware time or host device (e.g., CPU) clock. The sender clock and the receiver clock may or may not be the same type. In some situations, calibration or mapping scheme may be employed to map NIC timestamp to a host timestamp. In some situations, clock frequency drift may occur between the sender clock and the receiver clock resulting in a trend of latency change. Detection and correction of frequency drift is discussed later herein.

A timestamp representing the current time when the data packet 111 is sent may be included in the data packet 111. The timestamp may be generated by the sender clock. The timestamp can be embedded in any field of the data packet. The timestamp may be multi-bit. The timestamp may comprise any number of bits such as 32-bit or 64-bit. The timestamp may provide a time resolution at picosecond, millisecond, or microsecond scale.

In some embodiments, each data packet 111 is timestamped. Alternatively, some of the data packets are timestamped. For instance, timestamp representing send time may be included every X number of packets, where X may be any integer number.

Upon receiving a data packet comprising the timestamp, a latency may be calculated by the receiver. The latency may be determined by subtracting the timestamp value in the data packet from the current value of the local clock at the receiver or vice versa. Because the current value of the local clock at the receiver may not synchronize with the sender clock, the differential may not represent the absolute latency. Thus the time differential may be referred to as pseudo-latency. In this disclosure, the terms "pseudo-latency" and "latency" are equivalent, and "latency" should not be construed to represent absolute latency.

A difference or change of latency may be used to predict an extent of congestion. The difference of change of latency values may indicate changes in queuing delay. For example, a positive change of latency due to increasing latency values may indicate a rising queue, while a negative change of latency may indicate a receding queue. In the situation when a positive change is detected, it is advantageous to react to delay without waiting for a standing queue to form thus achieve a low latency method. In the situation when a negative change is detected, it is advantageous to adjust the sending rate to fully utilize the bandwidth. In some cases, when the change of latency is determined to exceed certain extent such as by comparing the change of latency to a latency difference threshold, a notification message may be generated. The notification message may be generated when the increase change or decrease change exceeds a predetermined latency difference threshold. A congestion state may comprise a detection of the change of latency beyond the threshold. A congestion state may comprise the measured change of latency. A congestion state may further comprise any other variables related to latency as discussed later herein. In some embodiments, upon determination of a congestion state, a notification message may be generated by the receiver. The notification message may comprise a plurality of variables related to latency.

Figure 2:
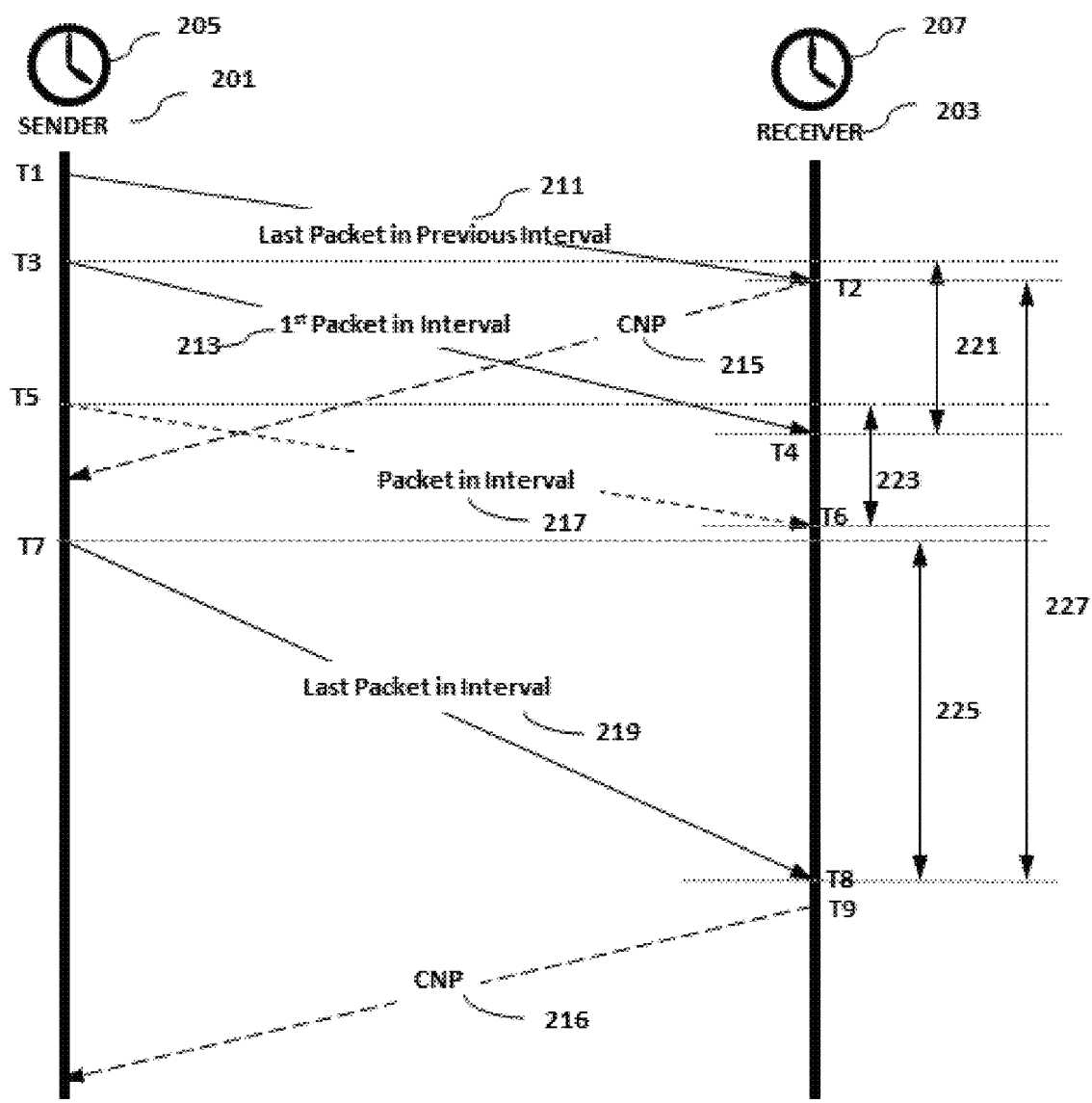
FIG. 2 schematically illustrates a plurality of variables measured in a congestion management system, in accordance with embodiments of the invention.

FIG. 2 schematically illustrates a plurality of variables measured in a congestion management system, in accordance with embodiments of the invention. The sender 201 and receiver 203 may be associated with local clocks 205, 207 respectively as described in FIG. 1. The sender and receiver may be configured to send and receive messages such as data packets, control packets, notification packets, and the like. As shown in FIG. 2, one or more data packets 211, 217, 219 may be transmitted from the sender 201 to the receiver 203. In some cases, the one or more data packets may be timestamped by the local clock 205 of the sender. It should be noted that a sender and a receiver is depicted in the communication system, however any other components can be included in the system.

A data packet may be sent form the sender or the receiver at a first time and received by the other at a second time. The first time (e.g., T1) and second time (e.g., T2) may be determined by the local clocks 205, 207 respectively. The various time points such as T4 and T5, or T6 and T7 can occur simultaneously and/or in various orders. It is noted that each communication can comprise one or more packets; however, a communication is described as a single packet sent from one component to the other for readability. It is further noted that communications are depicted as non-overlapping and at various times for readability. Further, unless context suggests otherwise, any communication can overlap, can be in a different order, can be forwarded among various networks components (e.g., intermediate nodes, switches, etc). It is noted that any different amount of messages can be sent and received between the sender and receiver; likewise, the sender and the receiver can send messages to and/or receive messages from various other components not shown in the diagram.

As mentioned above, an extent of latency may be determined based on a change of latency. In some embodiments, when a change of latency is determined to exceed a latency difference threshold, a notification message 215, 216 may be generated. In some cases, a new interval 227 may begin at the generation of the notification message. In some cases, a new interval 227 may begin at detection of a congestion state. In some cases, a new interval may begin at receipt time or arrival time (e.g., T2) of a last data packet 211 from the previous interval. The interval can have any length of time such as microseconds, milliseconds, seconds, and the like.

As shown in the diagram, a latency 221 of the first data packet in an interval may be calculated. Upon receiving the first data packet by the receiver 203, the receiver may subtract the timestamp value T3 in the data packet from the current value T4 of the local clock at the receiver. The latency value may be computed for one or more messages or data packets 217 sent from the sender to the receiver. A difference or change of latency may be calculated between two or more data packets.

In some cases, the change of latency may be calculated as a difference between the current latency value and a previous latency value. The previous latency value may be a latency value of a single packet or an average of multiple previously obtained packets. In some cases, the previous latency value may be the latency value 221 of the first packet 213 in an interval 227. In some cases, the previous latency value may be the minimum latency value. In some cases, the previous latency value may be an average of multiple previously obtained latency values such as the first multiple packets or a moving average of multiple packets. In some cases, the previous latency value may be generated based on data from the previous interval. The previous latency value may be fixed or vary during an interval 227. For instance, when a minimum latency value tracked by the receiver 203 is taken as the previous latency value, the previous latency value may vary when the minimum value is updated. For instance, data packet 217 may have the minimum latency value 223 in the interval then for the subsequent data packets, the change of latency may be computed as the difference between the respective latency value and the minimum latency value. Similarly, when the latency value 221 of the first packet is taken as the previous latency value, for all of the subsequent data packets in the interval, the change of latency may be computed as the difference between the respective latency values and the latency value of the first packet.

In some cases, a change of latency is determined as the difference between the current latency value and a previous latency value. The current latency value can be the latency value of a single packet. The current latency value can be a moving average of multiple packets. This may provide advantages to avoid instantaneous spikes in the latency measurements. Various other methods or algorithms can be used to filter the spikes. In some cases, the change of latency can be a value derived from the current latency value and the previous latency value. For instance, the change of latency can be dimensionless, which is the difference between the current latency value and a previous latency value divided by the previous latency value (or current latency value).

In some cases, the last packet in interval 219 is the packet with a change of latency beyond a latency difference threshold. The current latency of the last packet may or may not be a moving average. The change may be an absolute value of a differential between the current latency value and a previous latency value. The differential may be positive or negative. When the latency difference threshold is met, a notification message 216 may be generated.

In some embodiments, the change of latency may be determined by the receiver. Alternatively, the change of latency may be determined by the sender. In some embodiments, the state of network congestion may be determined by the receiver. Alternatively, the state of network congestion may be determined by the sender.

In some embodiments, a notification message may be generated by the receiver. The notification message may be sent from the receiver to the sender. The notification message may be sent immediately when a change of latency is determined to be beyond a latency difference threshold (e.g., message 215 sent at T2). The notification message may be sent at a time point later than the end of interval (e.g., message 216 sent at T9). The notification message may comprise a plurality of variables indicating an increase or decrease of a congestion state or queueing delay. In some embodiments, at least some of the information contained in the notification message is used by the sender for further congestion management.

Figure 3:
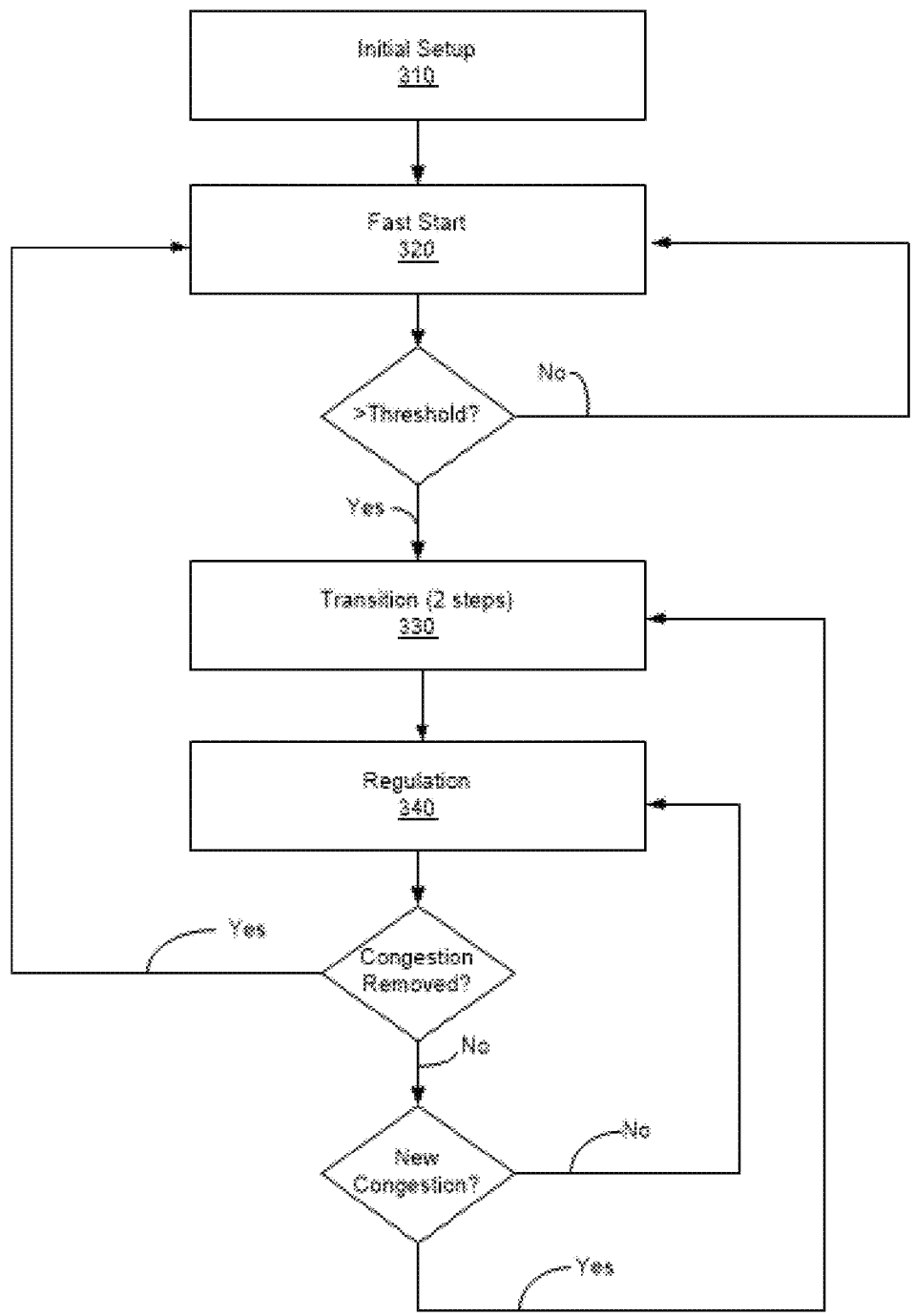
FIG. 3 illustrates a flow diagram for a method of congestion management in a physical layer link.

FIG. 3 illustrates a flow diagram for a method of congestion management in a data link, such as an Ethernet link. The flow diagram includes an initial setup phase, a fast start phase, a transition phase, and a regulation phase. The method may be implemented in the environment of FIG. 1, with data transmission between the sender 101 and the receiver 105.

In the initial setup phase 310, the sender and receiver may share information regarding each other's clock rates and line rates. This information allows the sender and receiver to determine acceptable latencies, and thus be able to detect congestion events by registering atypically large latency values (e.g., values above a particular threshold for data flows between the particular sender and receiver).

In the fast start phase 320, the sender sends data at an initial rate to the receiver.

The fast start phase 320 may be preceded with a window growth phase, in which the sender may set an initial window size for sending data packets and increases the size of the window as long as no congestion is detected within the network. The initial window size may be set to a bandwidth delay product, for example, of the line rate multiplied by a minimum propagation delay time within a network. As the window size increases, the receiver may notify the sender periodically that is has not detected congestion by sending a packet to the sender, for example, every 50 kilobytes of data received. The maximum size that a window may grow may be determined by its link rate multiplied by a maximum value of propagation delay within the network. The receiver may detect a congestion event by observing a spike in one-way latency with respect to data packets it receives from the sender. The spike in one-way latency may correspond to a delay that is larger than a round-trip time of a packet. For example, a delay of 15-25 microseconds may cause the receiver to register a congestion event. In some embodiments, the receiver may measure the latency relative to a minimum latency in order to register congestion events. In these embodiments, the receiver may configure a threshold latency, above which it may register a detected latency as a congestion event.

The sender may increase the window size exponentially. The sender may also increase the size linearly, logarithmically, or stepwise. The window size may be increased until a threshold size is achieved. The packet may signal the sender to increase the window size using a bit.

After the window growth within the fast start phase 320, the sender sets an initial rate. The initial rate may be a line rate, such as 25 GBit/s or 100 GBit/s. The initial rate may be affected by factors such as the type of physical network connecting the sender and receiver, the physical distance between the sender receivers, and the operation configurations of the sender and receiver. The sender may send traffic at full speed as long as the window does not become overloaded. The receiver may communicate with the sender using CNP packets. For example, the receiver may send a CNP-W packet to inform the receiver to keep sending packets at the line rate, or a CNP-R packet when a congestion event is detected.

When the receiver detects a congestion event, the system enters the transition phase 330. The receiver may send the sender a packet with a bit indicating that the sender should lower its rate of data transmission to a minimum rate. The minimum rate may be significantly smaller than that of the initial rate. For example, the minimum rate may be two to four orders of magnitude smaller than the initial rate. The system may stay in the transition state for one or more periods. A period may be based on a round trip time (RTT) of a packet. For example, a period may be 25 microseconds. This is performed in order to reduce the congestion in the system. After staying at the minimum rate for a particular number of periods, the system may increase the data transfer rate to one-half the initial transfer rate. The receiver may also measure the throughput between the sender and receiver. If the throughput is less than a portion of one-half the initial rate, then the receiver may send the sender a packet informing the sender to send at half the measured throughput. The sender may drop the sending rate when it receives the packet.

The system moves to the regulation stage 340 after staying in the transition stage for two update periods. The regulation phase may modify the data transmission rate using a feedback control loop and an additive increase multiplicative decrease (AIMD).

The feedback control loop may include a proportional integral (PI) algorithm. The feedback control loop may also be implemented using a proportional algorithm or a proportional-integral-derivative (PID) algorithm. The PI algorithm may ensure efficiency and low latency. Calculation of the data transmission rate may be updated periodically based on how far the current latency is away from a threshold value (e.g., the minimum latency value) and whether the queuing latency is currently trending up or down. The "proportional" aspect of the algorithm makes it more likely that the algorithm will reduce the data transmission rate if the latency is high, while the "integral" aspect of the algorithm works to make a reduced data transmission rate more likely if the queueing latency is trending up.

The feedback control loop may be described using the following expression.

$$R(n+1)=R(n)-\alpha(\Delta(n)-\theta)-\beta(\Delta(n)-\Delta(n-1))$$

In this expression, the updated rate $R(n+1)$ is calculated by subtracting from the current rate $R(n)$ the proportional term $\alpha(\Delta(n)-\theta)$ and the integral term $\beta(\Delta(n)-\Delta(n-1))$. The proportional term describes a difference between a current latency $\Delta(n)$ and a threshold latency $\theta$, multiplied by a constant. The integral term describes a difference between the current latency $\Delta(n)$ and a previous latency $\Delta(n-1)$, multiplied by a different constant, to incorporate an up or down latency trend into the expression.

The AIMD algorithm operates in conjunction with the feedback control loop to ensure fairness in the system. The AIMD algorithm may perform an additive increase to the data transfer rate if latency decreases, and may perform a multiplicative decrease if latency increases. This process adds fairness to the link among data flows, and may be performed over a longer time scale than the scale needed to control the latency. For example, the system may perform additive increases to rates for different data flows until a congestion event is detected by the receiver. At that point, the system may perform a multiplicative decrease on the data rates, in order to stop the congestion. This process may be repeated until the flows have equal data rates.

In some embodiments, the additive increase may be performed constantly while the system is in the regulation stage. While this occurs, the receiver may send the sender a packet, such as a CNP-R packet, to additively increase the rate. The multiplicative decrease may be performed periodically. In some embodiments, the system may perform a multiplicative decrease after a particular number of regulation cycles. In other embodiments, the multiplicative decrease may be performed in response to a probabilistic event, such as a "coin toss." The system may assign a multiplicative decrease probability to a "coin" and "flips the coin" every packet arrival to determine whether to perform a multiplicative decrease to the rate during that cycle. For example, if the multiplicative decrease probability is 30%, it may be expected that three times in ten packet transmissions, a multiplicative decrease would be performed.

The system may perform the feedback control loop and the AIMD loop jointly. The AIMD process may be performed at a lower frequency than the feedback control loop, as fairness can be achieved over a long time scale. Performing AIMD periodically, and less often than performing the control loop, allows data flows to be rebalanced with reduced disruption to packets arriving in the queue.

The regulation stage 340 may continue until data transmission has returned to the initial data rate. If the system returns to the initial rate for a number of periods, the system may again begin the fast start process 320.

Figure 4:
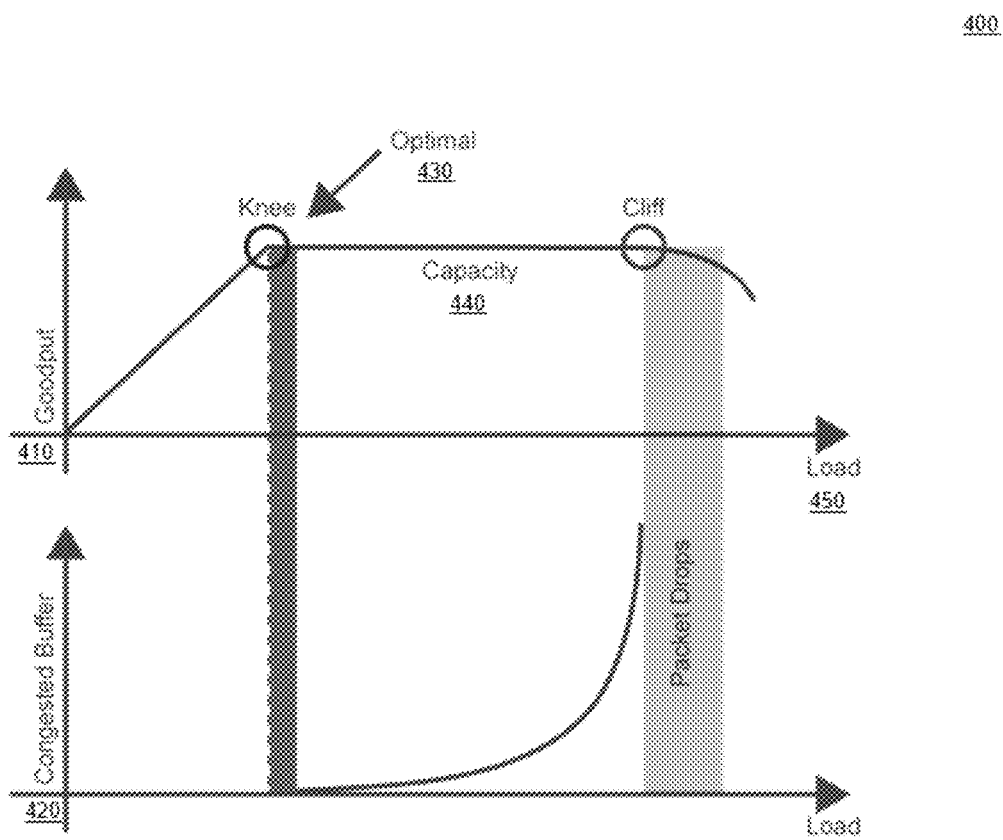
FIG. 4 illustrates an optimal operating point for the communication.

FIG. 4 illustrates an efficiency graph 400 for the communication. The illustration shows how goodput (number of useful information bits delivered per unit of time) and congested buffer size 420 increase as packet load increases for the link layer. The illustration shows that as the data load increases from zero, so does goodput 410 increase linearly. When the packet load 450 increases past capacity 440, the curve transitions from linear to flat, forming a knee in the graph. This is an optimal operating point 430 of the system, with maximum goodput and a negligible queue. The bottom graph shows a queue building as the packet load increases past the knee as not all packets can be transmitted by the system after this point. The graph shows that goodput 410 remains high even at large loads, as the queue builds. The system may be operated optimally with a small standing queue. The queue may increase in size exponentially as the load increases, as enqueued packets may not be transmitted before new packets are added to the queue. At a particular load, packets may be dropped as the system may not be able to handle maintaining such a large queue. The graph shows that in the disclosed method, the system operates close to the knee.

Figure 5:
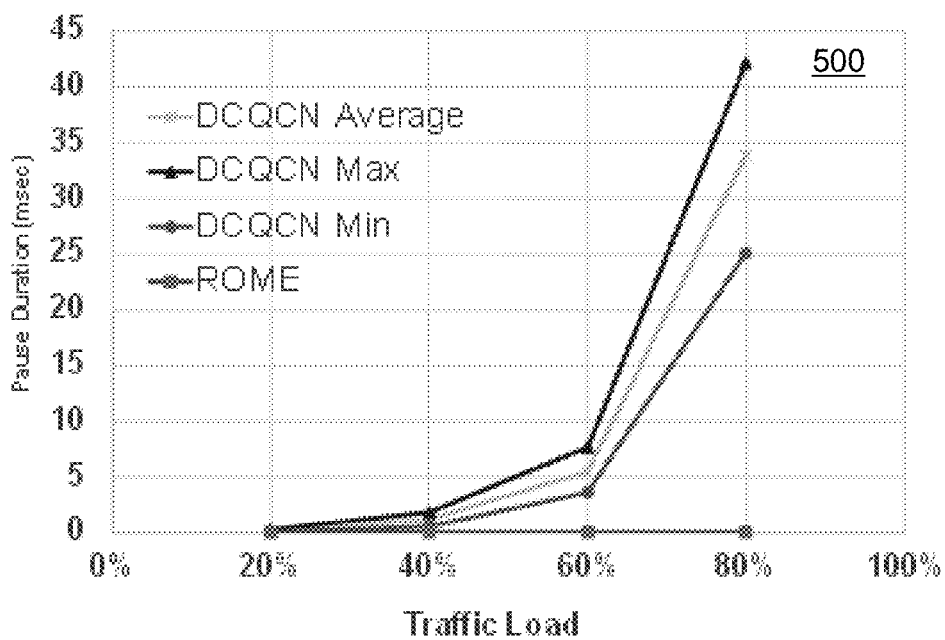
FIG. 5 illustrates a latency comparison of the disclosed method with DCQCN, using data from an experiment conducted with both methods.

FIG. 5 illustrates a latency comparison 500 of the disclosed method with DCQCN, using data from an experiment conducted with both methods. In the experiment of FIG. 5, for both DCQCN and the disclosed method, 20,000 data flows arrive at a receiver as a Poisson process. The flows come from 16 different ports with various round trip times (RTTs), all with a destination of the receiver. The arrival rate of packets to the receiver is controlled to perform experiments where the link between senders and the receiver is 20, 40, 60 and 80% loaded. For these 16 ports in both DCQCN and the method, the minimum pause duration, average pause duration, and maximum pause duration of Ethernet frames was measured. As can be seen from the graph, at high loads, DCQCN performs poorly compared with the disclosed method. In fact, the pause duration for DCQCN becomes exponentially worse at high loads. By comparison, at high loads, the disclosed method, no pause frames are generated, even at high loads.

Figure 6A:
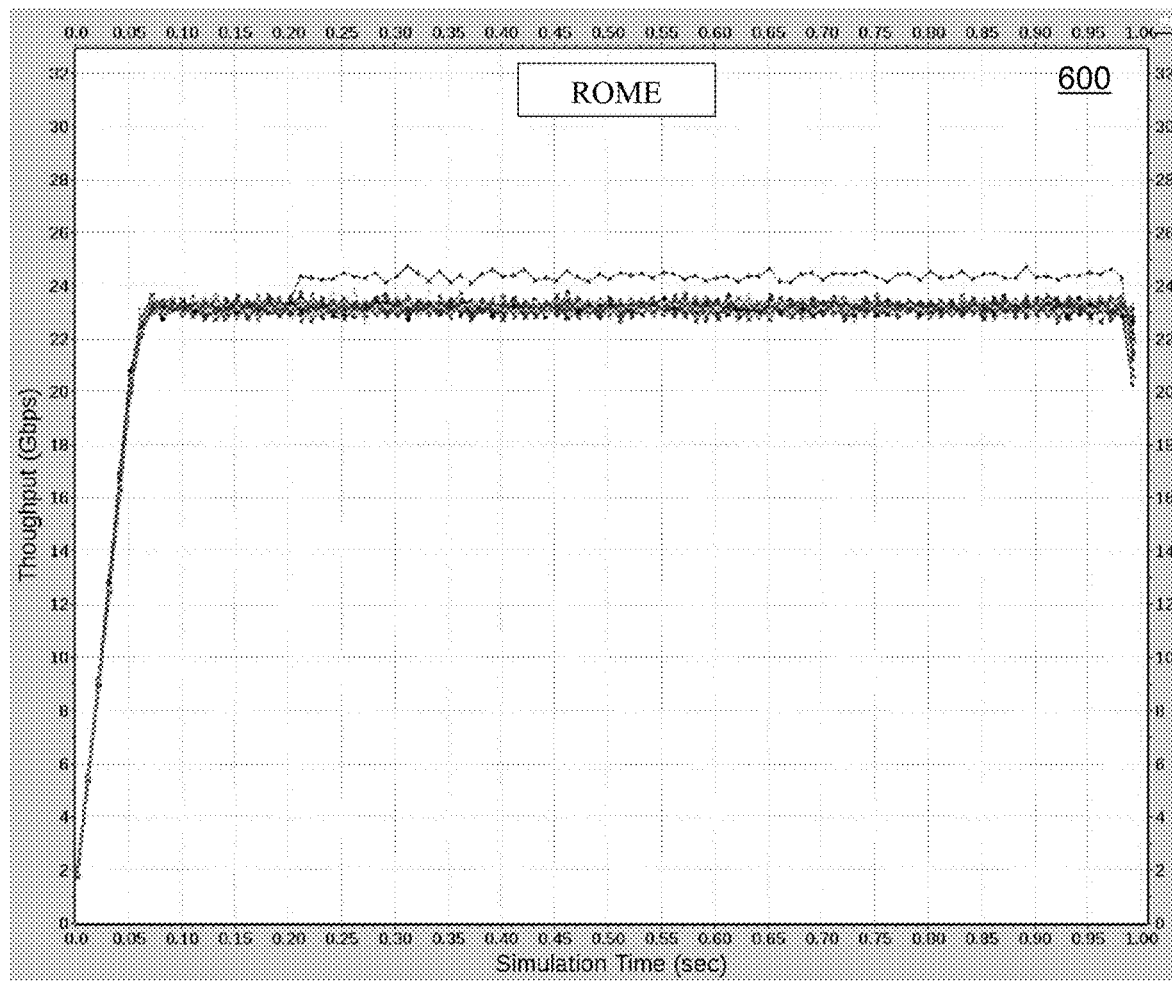
FIGS. 6A and 6B show illustrations of data flows, in the networks from the experiment of FIG. 5.
Figure 6B:
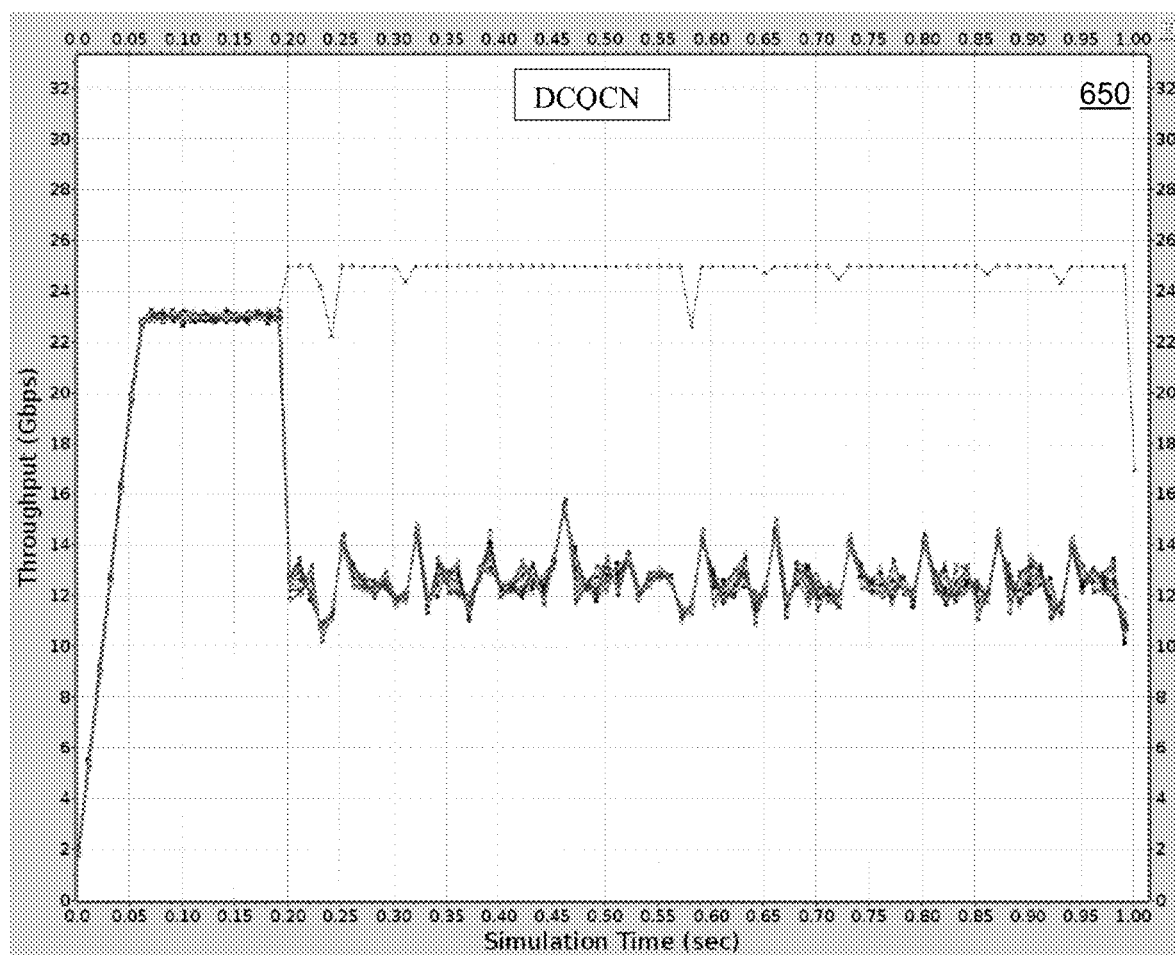

FIGS. 6A and 6B show illustrations of data flows, in the networks from the experiment of FIG. 5. The illustration 600 of FIG. 6A demonstrates throughput from the disclosed method, while the illustration 650 of FIG. 6B demonstrates throughput from DCQCN. The illustration 650 shows significant victim flows. Victim flows, or reduced throughput flows, indicate congestion spreading across the data center network. Thus, FIGS. 6A and 6B show significant congestion spreading when DCQCN is used, but negligible congestion when the disclosed method is used.

Figure 7A:
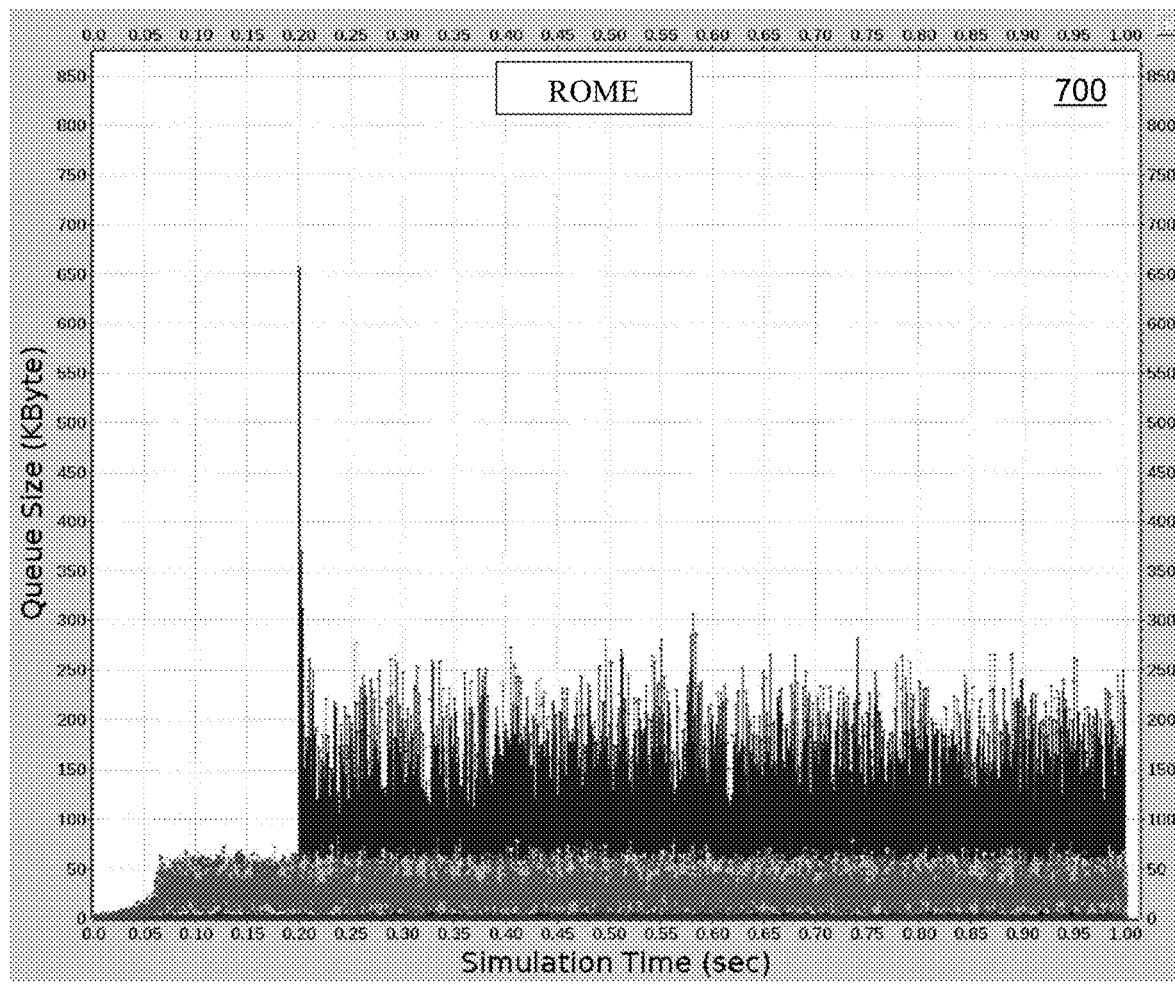
FIGS. 7A and 7B illustrate a comparison in queue occupancy between the disclosed method and DCQCN.
Figure 7B:
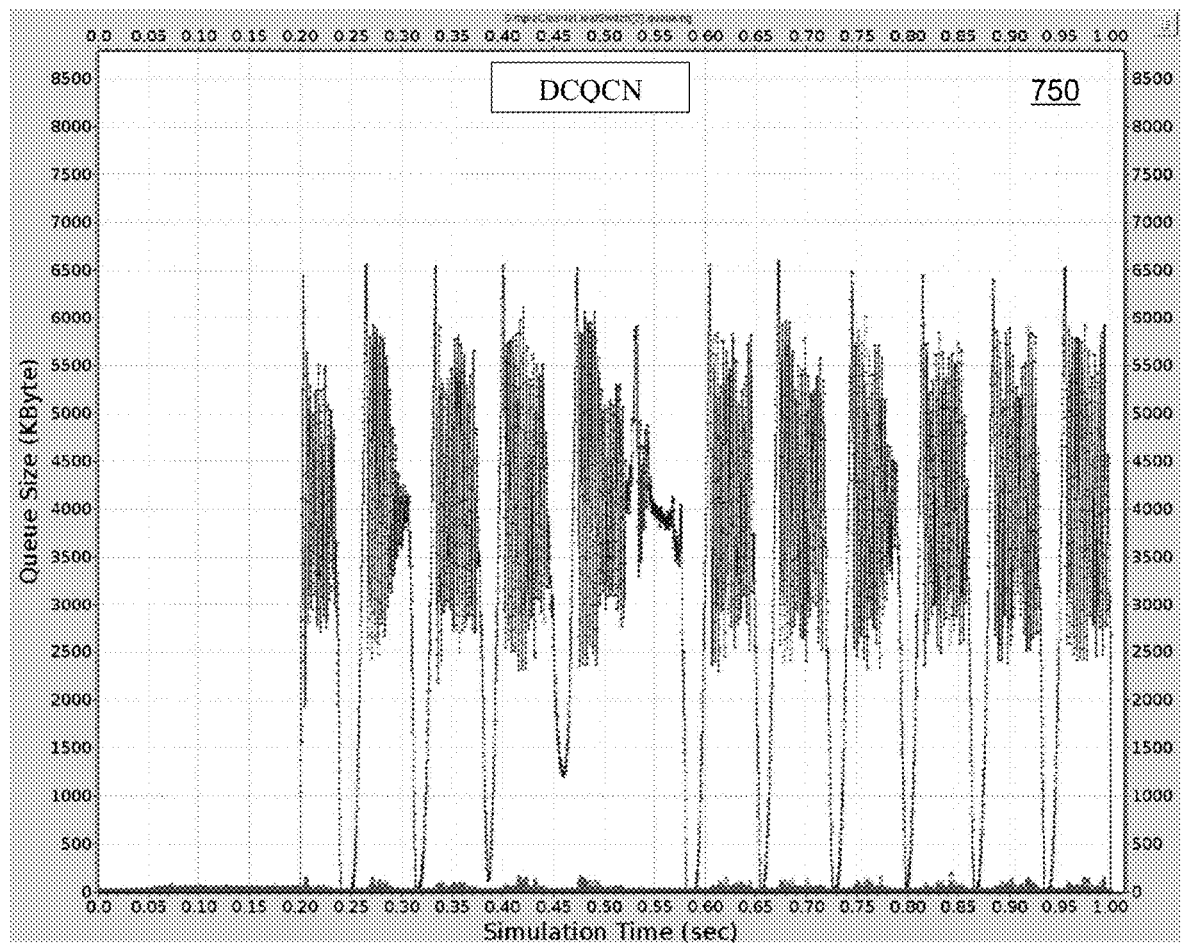

FIGS. 7A and 7B illustrate a comparison in queue occupancy between the disclosed method 700 and DCQCN 750. The graph shows that there is less data in the queue for the system than with DCQCN. The charts of FIGS. 7A and 7B reflect the results of an experiment. In the experiment, there are 640 nodes in a 3-tier data center network. Each node has two 25 Gbps links connected to a pair of top-of-rack (ToR) switches. The round trip propagation delay between nodes is 12 microseconds. PFC is enabled. The 640 nodes continuously transmit data packets to one group of 32 nodes under one pair of ToR switches. Each of the 32 nodes also transmits data packets to the other 639 nodes. The experiment removes one link towards one of the 32 nodes during the middle of the simulation and observes how the removal of the link affects other servers. FIGS. 7A and 7B compare the queue occupancy of the congested link from this experiment under the disclosed method and DCQCN and show that the disclosed method reduces the queue occupancy to be only one-tenth of what it would be under DCQCN.

What is claimed is:

1. A computer-implemented method of managing congestion in a network protocol, the method comprising:
 a) detecting a congestion event in a network;
 b) slowing a data transfer rate from an initial data transfer rate to a minimum data transfer rate; and
 c) adjusting the data transfer rate using a combination of a feedback control loop and an additive increase multiplicative decrease (AIMD) algorithm, wherein the feedback control loop comprises a proportional-integral controller, wherein the AIMD algorithm and the feedback control loop execute at different frequencies to adjust the data transfer rate.

2. The computer-implemented method of claim 1, wherein monitoring a one-way latency comprises performing a comparison of the one-way latency to a threshold latency and determining a trend of the one-way latency, and wherein the threshold latency is based on a round trip time for a transmission of a data packet.

3. The computer-implemented method of claim 1, wherein the minimum data transfer rate is at least less than one percent of the initial data transfer rate.

4. The computer-implemented method of claim 1, wherein slowing the data transfer rate from the initial data transfer rate to the minimum data transfer rate comprises: sending a congestion notification packet from a receiver to a sender, and updating a rate upon sender receipt of the congestion notification packet.

5. The computer-implemented method of claim 1, wherein monitoring a one-way latency comprises keeping track of a total number of bytes of received packets.

6. The computer-implemented method of claim 1, further comprising:

f) obtaining at least the initial data transfer rate from adjusting the data transfer rate for a threshold number of periods; and g) monitoring the network for congestion events.

7. The computer-implemented method of claim 1, wherein the AIMD is used to adjust the data transfer rate less frequently than the feedback control loop.

8. A system for managing network congestion in a network, comprising a plurality of computing nodes, a computing node comprising:

a) a memory for storing one or more previously obtained latency values and a set of instructions; and b) one or more processors configured to execute the set of instructions to perform operations comprising:

i) detecting a congestion event in the network;

ii) slowing a data transfer rate from an initial data transfer rate to a minimum data transfer rate; and iii) adjusting the data transfer rate using a combination of a feedback control loop and an additive increase multiplicative decrease (AIMD) algorithm, wherein the feedback control loop comprises a proportional-integral controller, wherein the AIMD algorithm and the feedback control loop execute at different frequencies to adjust the data transfer rate.

9. The system of claim 8, wherein the initial data transfer rate is determined at least in part by setting an initial window that is equal to a bandwidth delay product and ramping up window size if no congestion is detected after setting the initial window.

10. The system of claim 8, wherein monitoring a one-way latency comprises performing a comparison of the one-way latency to a threshold latency and determining a trend of the one-way latency, and wherein the threshold latency is based on a round trip time for a transmission of a data packet.

11. The system of claim 8, wherein the minimum data transfer rate is at least less than one percent of the initial data transfer rate.

12. The system of claim 8, wherein the plurality of computing nodes includes a sender node and a receiver node.

13. The system of claim 12, wherein slowing the data transfer rate from the initial data transfer rate to the minimum data transfer rate comprises: sending a congestion notification packet from the receiver node to the sender node, and updating a rate upon sender receipt of the congestion notification packet.

14. The system of claim 8, wherein monitoring a one-way latency comprises keeping track of a total number of bytes of received packets.

15. The system of claim 8, wherein the AIMD is used to adjust the data transfer rate less frequently than the feedback control loop.

16. A computer-implemented method for managing network congestion in a network, the computer-implemented method comprising:

a) a fast start stage, comprising setting a data rate to an initial data rate and performing data transfer between a sender and a receiver until the receiver detects a congestion event;

b) a transition stage, comprising reducing the data rate to a minimum data rate for a first period; and c) a regulation stage, comprising performing a combination of a feedback control loop and an additive increase multiplicative decrease (AIMD) algorithm to modify the data rate, wherein the feedback control loop is a proportional integral algorithm, wherein the feedback control loop is described as a difference between a current rate, a proportional term, and an integral term, and wherein the proportional term describes a difference between a current latency and a threshold latency, while the integral term describes a difference between a current latency and a previous latency.

17. The computer-implemented method of claim 16, further comprising, prior to the fast start stage, an initial setup phase, comprising sharing clock rates and line rates between the sender and the receiver.

18. The computer-implemented method of claim 16, wherein the transition stage begins following the detection of the congestion event.

19. The computer-implemented method of claim 16, wherein a multiplicative decrease is performed in response to a probabilistic event.

20. The computer-implemented method of claim 16, wherein a multiplicative decrease is performed at a lower frequency than the feedback control loop.

21. A system for managing network congestion in a network, comprising a plurality of computing nodes, a computing node comprising:

a) a memory for storing one or more previously obtained latency values and a set of instructions; and b) one or more processors configured to execute the set of instructions to implement at least the following:

i) a fast start stage, comprising setting a data rate to an initial data rate and performing data transfer between a sender and a receiver until the receiver detects a congestion event;

ii) a transition stage, comprising reducing the data rate to a minimum data rate for a first period; and iii) a regulation stage, comprising performing a combination of a feedback control loop and an additive increase multiplicative decrease (AIMD) algorithm to modify the data rate, wherein the feedback control loop is a proportional integral algorithm, wherein the feedback control loop is described as a difference between a current rate, a proportional term, and an integral term, and wherein the proportional term describes a difference between a current latency and a threshold latency, while the integral term describes a difference between a current latency and a previous latency.

22. The system of claim 21, further comprising, prior to the fast start stage, an initial setup phase, comprising sharing clock rates and line rates between the sender and the receiver.

23. The system of claim 21, wherein the transition stage begins following the detection of the congestion event.

24. The system of claim 21, wherein a multiplicative decrease is performed in response to a probabilistic event.

25. The system of claim 21, wherein a multiplicative decrease is performed at a lower frequency than the feedback control loop.

* * * * *